Oct. 3, 1967   N. G. GALLUP   3,344,947
FILL CAP FASTENING MEANS
Filed Oct. 21, 1965
FIG.1
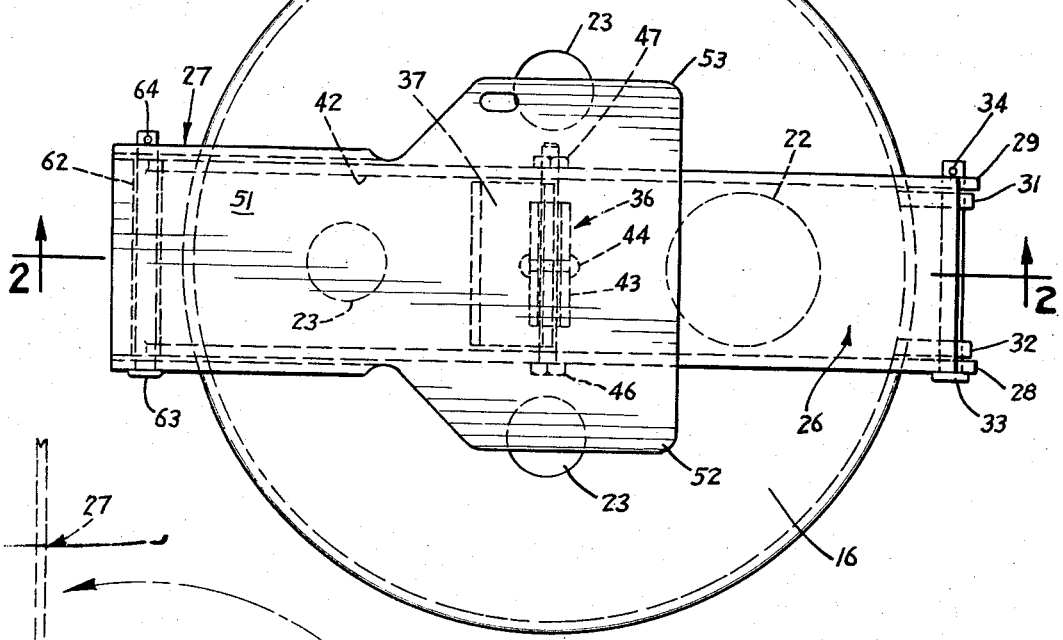
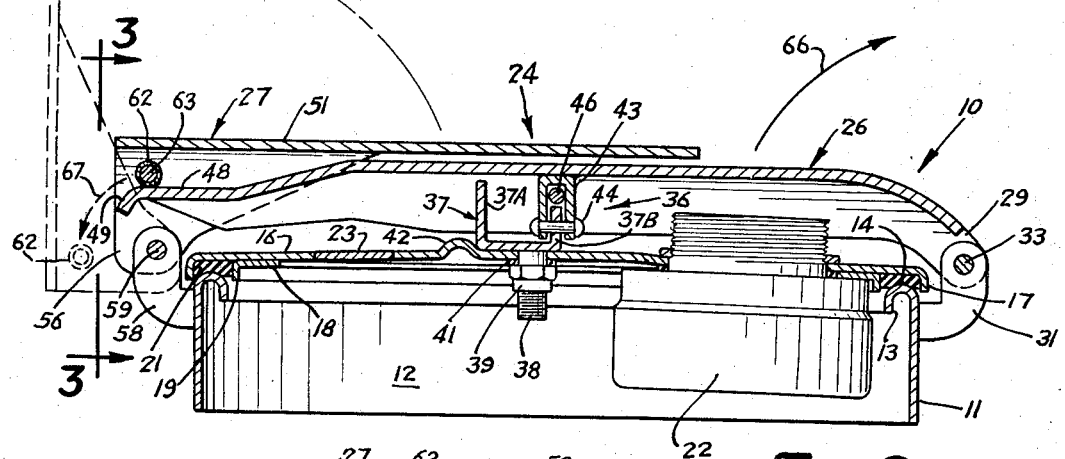
FIG.2
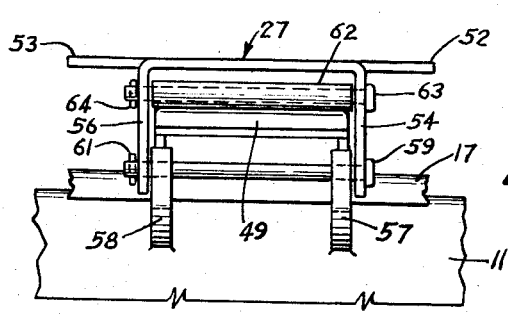
FIG.3
INVENTOR.
NORMAN G. GALLUP
BY
Braddock+Burd
ATTORNEYS

United States Patent Office 3,344,947
Patented Oct. 3, 1967

3,344,947
FILL CAP FASTENING MEANS
Norman G. Gallup, Minneapolis, Minn., assignor to Brown Steel Tank Company, Minneapolis, Minn., a corporation of Minnesota
Filed Oct. 21, 1965, Ser. No. 499,221
15 Claims. (Cl. 220—57)

This invention relates to a cover assembly for closing an opening in a container and more particularly to a cover assembly having a combined closure member and lock device for closing a filler opening of a tank.

It is the object of the invention to provide an improved cover assembly held in a locked position to close a filler opening of a tank and readily movable from the locked position to an open position which does not inhibit access to the filler opening.

A further object of the invention is to provide in combination with a filler opening closure member, a locking lever having an elongated roller for positively holding the closure member in sealed relation with a seat on a filler collar.

Another object of the invention is to provide a stable locking device for holding a closure member in sealed relation on a portion of a tank closing an opening in the tank with a pair of levers which coact with each other to maintain a positive holding force on the closure member.

These and other objects and advantages of the cover assembly of this invention are apparent in the following detailed description and drawing wherein:

FIGURE 1 is a plan view of the cover assembly showing the closure member and lock device in the closed and locked position;

FIGURE 2 is a sectional view taken along the line 2—2 showing the cover assembly in combination with an upright cylindrical collar surrounding a filler opening or manhole of a tank; and FIGURE 3 is a reduced sectional view taken along the line 3—3.

Referring to the drawing, there is shown in FIGURE 2 the cover assembly of this invention indicated generally at 10 in assembled relation on an upright cylindrical collar 11 surrounding a man hole or opening 12 open to a container such as a tank vehicle used to transport liquids as milk, water, oil and the like. Collar 11 usually located on top of the tank projects upwardly terminating a reverse inturned flange 13. The top edge of the flange 13 forms an annular seat 14 having a convex shape in cross-section.

The cover assembly 10 comprises a cover or closure member 16 having a slightly convex shape. The closure member is a circular disk having a diameter slightly greater than the diameter of the cylindrical collar 11. The outer circumferential edge of the closure member 16 terminates in a downwardly projected peripheral flange 17. Spaced inwardly from the flange 17 is a circular ring 18 having a downwardly projected flange 19 located substantially concentric with the peripheral flange 17. Flanges 17 and 19 form an annular groove for accommodating an annular seal 21 of yieldable material, as rubber, plastic and the like. When the closure member 16 is in the closed position the annular seal 21 rests on the annular seat 14 presenting the escape of liquid and air from the tanks.

The closure member 16 has a large opening accommodating a vent valve or emergency pressure release valve 22 operable to automatically release excessive pressure from within the tank and to serve as a safeguard against tank explosions. Examples of the structural details of valve 22 are shown in the patent to Brown No. 2,349,137 and in co-pending application Ser. No. 407,027 filed Oct. 28, 1964, now Patent No. 3,283,427. In addition to the vent valve 22 the closure member 16 has three circumferentially spaced fuse plugs 23 mounted in yielding relationship in suitable holes in the closure member.

The closure member 16 is held in a locked position against the annular seat 14 of the collar 11 by a releasable lock device indicated generally at 24 having a pair of cocting levers 26 and 27. As shown in FIGURE 2, in the locked position the levers are in folded overlapped relation making the lock device 24 a substantially flat and compact structure. The first lever 26 is a strong arm having a generally channel shape formed from a blank in a single stamping operation. Longitudinal flanges 28 and 29 extend along the sides of the web of the strong arm and terminate in downwardly curved end portions located on opposite sides of upwardly projected angle shaped lugs 31 and 32 secured to the outside of the collar 11. Flanges 28 and 29 and lugs 31 and 32 are pivotally connected with a transverse pin 33 extended through holes in the flanges and lugs, respectively. A retainer 34, as a cotter key, split ring or the like, holds the pin 33 in assembled relation with the flanges and lugs.

The mid-portion of the strong arm 26 is connected to the center of the closure member 16 by a universal joint indicated generally at 36. In use the joint 36 permits closure members 16 to have limited rocking movement relative to the strong arm 26 enabling the annular seal 21 to fully seat on the annular edge 14 of the collar 11. The universal joint 36 comprises a U-shaped member 37 having a stud 38 projected downwardly through a hole in the center section of the closure member 16. Nut 39 threaded onto the stud 38 biases an annular gasket 41 into engagement with the inside of the closure member 16 to secure in sealed relationship the U-shaped member 37 to the closure member. The U-shaped member 37 has upwardly projected legs 37A and 37B extended transversely between the flanges 28 and 29 of the strong arm. Leg 37A extends transversely along the side of an upwardly projected rib 42 on the closure member thereby preventing rotation of the U-shaped member 37. A U-shaped clevis 43 having downwardly projected legs located on opposite sides of the leg 37B is pivotally connected to the center of leg 37B by a rivet 44. The legs of the clevis 43 have semi-circular shapes permitting limited rocking movement of the closure member 16 about the axis of the rivet 44. A transverse bolt 46 projects through the clevis 43 above the leg 37B and through suitable holes in the flanges 28 and 29. Nut 47 is threaded on the end of the bolt 46 to hold the bolt 46 in assembled relation with the strong arm. As shown in FIGURE 2, bolt 46 is positioned in clearance relation with respect to the clevis 43 enabling the clevis to rock about the axis of the bolt 46. The leg 37A limits this rocking movement because it functions as a stop when it engages the strong arm 26.

The outer end of the web of the strong arm 26 has a downwardly stepped flat horizontal section 48 terminating in a downwardly and inwardly curved lip 49. The flat horizontal section 48 and the lip 49 has a transverse width equal to the remainder of the web of the strong arm.

The second lever 27 is a lock arm formed from a single blank by a staping operation. As shown in FIGURE 1, lock arm 27 has a horizontal plate 51 positioned over the strong arm 26. The portion of the plate 51 over the center area of the closure member 16 has oppositely directed lateral projections 52 and 53 which serve as grips used to move the lock arm to a release position as shown in broken lines in FIGURE 2. Integral with the sides of the outer end of the plate 51 are a pair of downwardly projected flanges 54 and 56 terminating adjacent upright sides of angle lugs 57 and 58 secured to the collar 11.

The lugs 57 and 58 are angularly shaped and project outwardly and upwardly from the collar 11. The upper ends of the lugs 57 and 58 are pivotally connected to the flanges 54 and 56 by a transverse pin 59 projected through suitable holes in the flanges and lugs, respectively, when the strong arm 26 is in the closed position pin 59 is located below and extends transversely of the flat end section 48 of the strong arm. A retainer 61, as a cotter key or split ring, cooperates with the forward end of the pin to maintain pin 59 in assembled relation with the flanges 54, 56 and lugs 57, 58.

An elongated rotatable unit comprising a roller 62 located on a pin 63 positioned transversely between the flanges 54 and 56 extends substantially parallel to the pin 59. Pin 63 projects through holes in the flanges 54 and 56 adjacent the outer end of the horizontal plate 51 locating the roller 62 between pivot pin 59 and plate 51. A retainer 64, such as a cotter key or split ring, is attached to the forward end of the pin 63 to maintain pin 63 in assembled relation with the flanges 54 and 56. As shown in FIGURES 1 and 3, roller 62 extends over the full width of the flat end section 48 of the strong arm applying a downwardly directed force along a transverse plane over the entire width of the end of the strong arm. This line of force increases the stability of the strong arm 26 minimizing horizontal rocking movement of the strong arm when located in the closed position.

As shown in FIGURE 2, when the cover assembly is in the closed position lock arm 27 extends over more than one half of the strong arm 26 with the closure member 16 positioned in sealed relation with the annular seat 14 of the tank collar 11. The strong arm 26 is in a horizontal position with the universal joint 36 functioning as a strut connection between the mid-portion of the strong arm and the center of the closure member. The flat base of the clevis 43 bears against the strong arm web urging the rivet 44 in a downward direction forcing the U-shaped member 37 and the center section of the closure member 16 toward tank opening 12.

The strong arm 26 is maintained in the horizontal closed position by the lock arm 24 extended horizontally over the strong arm. The elongated roller 62 transversely rests on the flat horizontal section 48 forcing the strong arm 26 angularly in a downward direction about the pivot pin 33 toward the collar 11.

To remove the closure member 16 from the collar 11 the lock arm 24 is swung upwardly to the dotted line position shown in FIGURE 2. The arm 24 pivots about the pin 59 carrying the longitudinal roller 62 outwardly and downwardly from the strong arm lip 49. The strong arm 26 can now be rotated in an opposite direction indicated by arrow 66 upwardly away from collar 11. The closure member 16 moves along with the strong arm 16 away from the cylindrical collar 11. Both the lock arm 24 and strong arm 26 are rotatable away from each other until they rest on the top of the tank. In this position the lock arm 24 and the closure member 16 along with the vent valve 22 does not inhibit access to the opening or manhole 12.

To close the manhole 12 the strong arm 26 is angularly moved to carry the closure member 16 into engagement with the top of the tank collar 11 as shown in FIGURE 2. The universal joint 36 permits the closure member 16 to have limited rocking movement to insure full seating engagement of the seal 21 with the annular collar seat 14. The closure member 16 is locked in the closed position by moving the lock arm 27 to a position over the strong arm 26. This angular movement of the lock arm moves the elongated roller 62 upwardly along an arcuate path indicated by arrow 67. The elongated roller initially engages the curved lip 49 along its entire width and rolls upwardly along the lip onto the flat end section 49. The lip 49 serves as a curved ramp having a radius of curvature which is smaller than the arcuate path of movement of the roller 62. Thus, the roller 62 as it moves up the curved lip 49 progressively forces the strong arm 26 in a downward direction sealing the closure member 16 on the annular collar seat 14. When the roller 63 is on the flat section 48 the strong arm 26 and closure member 16 are held in their closed position. In the closed positions strong arm 26 and lock arm 27 function as coacting second class levers holding the closure member 16 in engagement with the collar 11. As shown in FIGURE 2 when arms 26 and 27 are in the closed positions the axis of roller 62 is in an upright plane located outwardly from the axis of pin 59. This places roller 62 off center with respect to the upright plane of pin 59. When upward force, as fluid pressure in the tank, is applied to closure member 16 lever 26 is urged in an upward direction forcing roller 62 to move on the flat section 48 into the upright plane of pin 59. Thus, lever 24 is kept in the closed position by the internal fluid pressure in the tank.

The cost of fabricating the cover assembly 10 is substantially less than the manufacturing cost of prior cover assemblies because the closure member 16, strong arm 26 and lock arm 27 are all formed by forging or stamping operations. The closure member 16 and the arms 26 and 27 are each forged from one-piece sheet metal blanks into their final shapes. The forging operation utilizes a minimum amount of material and provides the arms 26 and 27 with maximum strength at a relatively low cost.

While there have been shown and described the novel features of the invention it is apparent that many modifications and variations of the cover assembly can be made without departing from the spirit and scope of the invention. The specific embodiment described is given by way of example only and the invention is to be limited only as indicated by the scope of the following claims.

I claim:

1. A cover assembly for closing an opening defined by a cylindrical collar having a reverse turned end flange comprising:
   (a) a circular closure member engageable with the reversed turned end flange for closing the opening,
   (b) a strong arm having an elongated member positioned diametrically over the closure member, said member having a flat end section terminating in an inwardly curved lip and side flanges secured to the sides of the elongated member and projected toward the closure member,
   (c) first lug members secured to the cylindrical collar and projected upwardly adjacent the side flanges,
   (d) first means pivotally connecting the first lug members and the flanges whereby the strong arm has angular movement toward and away from said collar in the plane of the strong arm,
   (e) universal joint means pivotally connecting the mid-portion of the elongated member to the center of the closure member,
   (f) a lock arm for holding the strong arm and closure member in a closed position relative to the opening, said lock arm having a plate and downwardly projected flanges secured to the opposite sides of one end of the plate,
   (g) second lug members secured to the collar opposite the first lug members, said second lug members projected upwardly adjacent the flanges of the lock arm,
   (h) second means pivotally connecting the lock arm flanges with the second lug members whereby the lock arm has angular movement toward and away from the strong arm, and
   (i) an elongated roller rotatably mounted on said flanges of the lock arm on an axis parallel to and above the axis of the second pivot means, said roller means on angular movement of the lock arm toward the strong arm engages the curved lip and moves up onto the flat end section of the strong arm forcing and holding the strong arm and closure member in the closed position.

2. The cover assembly defined in claim 1 wherein:
(a) the plate of the lock arm is positioned above in overlapped relation with respect to the flat member of the strong arm when it is in the closed position.
3. The cover assembly defined in claim 1 wherein:
(a) said plate of the lock arm has at least one lateral projection secured to the end opposite the flanges.
4. A cover assembly for closing an opening defined by a cylindrical collar having a reverse turned end flange comprising:
(a) closure means movable to a closed position over said collar and engageable with the end flange of the collar to close the opening,
(b) a strong arm having flat elongated member positioned diametrically over the closure means, said member having a flat end section terminating in an inwardly curved lip,
(c) means pivotally connecting the end of the strong arm opposite the flat end section to the collar for angular movement toward and away from said collar in the plane of the strong arm,
(d) universal joint means pivotally connecting the mid-portion of the strong arm to the center of the closure means,
(e) a lock arm for holding the strong arm and closure means in a closed position,
(f) means pivotally mounting the lock arm on the collar for angular movement toward and away from said strong arm, and
(g) an elongated roller rotatably mounted on said lock arm on an axis parallel to the pivot means for the lock arm, said roller having a length at least equal to the width of the strong arm member and said roller means on angular movement of the lock arm toward the strong arm moves up the curved lip and onto the flat end section of the member forcing and holding the strong arm and closure member in the closed position.
5. The cover assembly defined in claim 4 including:
(a) stop means projected from the closure means and engageable with the strong arm to limit movement of the closure means relative to the strong arm.
6. A cover assembly for closing an opening in a tank comprising:
(a) a closure member engageable with a portion of the tank for closing the opening in the tank,
(b) a first lever positioned over the closure member, said lever having a flat end terminating in a lip curved inwardly toward the closure member,
(c) means connecting the first lever and closure member,
(d) first pivot means conecting the end of the first lever opposite the flat end to a portion of the tank for angular movement toward and away from said tank moving the closure member to open and closed positions,
(e) a second lever for holding the first lever and closure means in their closed positions,
(f) second pivot means connecting the second lever below the flat end of the first lever to a portion of the tank for angular movement to and from a position over the first lever, and
(g) roller means carried by the second lever above and substantialy parallel to the pivot axis of the second lever, said roller means on angular movement of the second lever toward the first lever moves up the curved lip and onto the flat end section of the first lever holding the first lever in a position wherein the closure member engages the portion of the tank closing the opening in the tank.
7. The cover assembly defined in claim 6 wherein:
(a) said closure member is a circular disk and
(b) said first lever has a length greater than the diameter of the closure member.
8. The cover assembly defined in claim 6 wherein:
(a) said roller means has a length at least equal to the width of the flat end of the first lever.
9. The cover assembly defined in claim 6 wherein:
(a) said means connecting the first lever and closure member including universal joint means allowing limited rocking movement of the closure member relative to the first lever means, and
(b) stop means engageable with the first lever to limit rocking movement of the closure member.
10. A lock device for holding a cover on a support comprising:
(a) a first lever pivoted at one end to the support and extended over the cover, the opposite end of the lever having a flat section terminating in lip curved inwardly toward the cover,
(b) means connecting the first lever with the cover,
(c) a second lever pivoted at one end to the support below the flat section of the first lever,
(d) roller means carried by the second lever above the pivot axis of the second lever, said roller means on angular movement of the second lever toward the first lever moves up the curved lip and onto the flat end section of the first lever holding the first lever in a position wherein the cover engages the support.
11. The lock device of claim 10 wherein:
(a) said roller means has a length at least equal to the width of the flat section of the first lever.
12. The lock device of claim 10 wherein:
(a) said first lever and said second lever are fabricated from sheet metal blanks by forging operations.
13. The cover assembly of claim 1 wherein:
(a) said strong arm and said lock arm are fabricated from metal blanks by forging operations.
14. The cover assembly defined in claim 4 including means for rotatably mounting said elongated roller on said lock arm on an axis parallel to the pivot means for the lock arm whereby when said lock arm is in the closed position said roller is positioned on said flat end section outwardly from the upright plane of the axis of the pivot means so that upward force on the closure means urges the roller toward said upright plane thereby holding the lock arm in the closed position.
15. The cover assembly defined in claim 6 wherein when said second lever is in the closed position the roller means is located outwardly from the upright plane of the axis of the second pivot means whereby upward force on the closure member urges the roller means toward said upright plane thereby holding the second lever in the closed position.

References Cited
UNITED STATES PATENTS

| | | | |
|---|---|---|---|
| 2,783,913 | 3/1957 | De Frees | 220—46 |
| 3,179,285 | 4/1965 | De Frees | 220—44 X |
| 3,292,814 | 12/1966 | Krobe | 220—57 |

THERON E. CONDON, *Primary Examiner.*

G. T. HALL, *Assistant Examiner.*